Oct. 31, 1967 W. STRASS 3,350,061
EXPANSION-TURBINE NOZZLE RING AND APPARATUS INCORPORATING SAME
Filed April 13, 1965 3 Sheets-Sheet 1

WILFRIED STRASS
INVENTOR

BY Karl F. Ross
Attorney

United States Patent Office 3,350,061
Patented Oct. 31, 1967

3,350,061
EXPANSION-TURBINE NOZZLE RING AND APPARATUS INCORPORATING SAME
Wilfried Strass, Sürth, near Cologne, Germany, assignor to Linde Aktiengesellschaft, a corporation of Germany
Filed Apr. 13, 1965, Ser. No. 447,666
Claims priority, application Germany, Apr. 15, 1964, G 40,356
15 Claims. (Cl. 253—40)

ABSTRACT OF THE DISCLOSURE

An expansion turbine having a nozzle ring with blades circumferentially spaced around a circle for directing jets of a fluid medium into an expansion chamber against a rotor, the array being subdivided into at least two sectors with relatively low fluid throughput and relatively high fluid throughput per unit of circumferential extent and respective ducts provided with valves for selectively controlling the fluid flow to the nozzles of relatively high fluid throughput, the latter sector extending over a smaller arc than the sector of relatively low fluid throughput, thereby controlling the efficiency of the turbine upon a decrease in the total throughput.

---

The present invention relates to expansion turbines having one or more expansion stages into which a fluid is fed for expansion through a multiplicity of nozzles to drive a rotor and, more particularly, to an improved nozzle ring for such turbines, apparatus incorporating the improved nozzle ring and a method of operating an expansion turbine.

Expansion turbines are provided for many purposes (e.g. for the decreasing of the pressure of a gas in a fractional-liquefaction or rectification plant), for the conversion of liquids into gases and like processes in which the temperature of the fluid is reduced as the volume thereof increases. Such turbines have also been employed for the recovery of the potential energy of compressed gases and readily vaporizable liquids into useful work. Turbines of this general type have been proposed heretofore for the expansion of a fluid medium through an annular array of nozzles to which the fluid is uniformly distributed. In this arrangement, a more or less complete expansion of the fluid is effected, upon a single pass through the nozzles, to the terminal pressure within each stage or turbine chamber. It is known that the operating efficiency of an expansion turbine of this general character is dependent upon the throughput (i.e. volume rate of flow) of the driving medium. In general, the operating efficiency of the turbine falls more or less rapidly with reduction of the fluid throughput and this throughput cannot be maintained constant except in entirely unusual or extraordinary circumstances. Thus expansion turbines must be designed for a particular operational range of fluid throughput and have heretofore been characterized by a reduction in operating efficiency with a lowering of this throughput. Concern with this problem has, in the past, resulted in many proposals for maintaining the throughput substantially constant and for minimizing deviations from an optimal value. For example, it has been proposed to provide a throttling device or pre-expansion antechamber between the source of the driving medium and the turbine chamber.

This arrangement has, however, the important disadvantage that it involves a preliminary pressure loss and thereby reduces the pressure drop which can be effected in the medium within the turbine. Since the energy efficiency (i.e. conversion of potential energy into kinetic energy) is also determined by the pressure drop within the expansion stage of the turbine, reduced efficiency is experienced even during normal operating periods. It is, however, possible to obtain a reduced rate of change of the efficiency upon variation of the throughput when the nozzles are defined between adjustable plates, blades or vanes which can compensate, by modifying the pressure drop across the nozzles, for reduction in throughput. Expansion turbines are, however, subjected to large temperature differentials and encrustation by soot, dust and other contaminants so that damage to the mechanism for shifting the nozzle plates renders this latter expedient satisfactory on technological grounds. Other arrangements to minimize variation of the throughput have involved cutting off some or all of the essentially identical nozzles of one or more stages of the turbine, this having the disadvantage that ventilation losses are experienced between the inoperative nozzles and the rotor cooperating therewith. In a latter case, the ventilation losses are added to friction and other losses of the turbine and rapidly reduce the efficiency of the system.

It is an important object of the present invention to provide a method of operating an expansion turbine wherein the aforementioned disadvantages can be avoided and the reduction in operating efficiency of the turbine with reduced throughput can be minimized.

Another object of this invention is to provide an expansion turbine in which ventilation losses can be reduced but wherein compensation can be made for varying throughput conditions.

Still another object of my invention is to provide an improved nozzle ring for an expansion turbine having minimum ventilation losses and a relatively limited decrease in operating efficiency upon reduction of fluid throughput.

A more specific object of the instant invention is to provide a nozzle ring for an expansion turbine which has a relatively simple and long-lasting construction and yet is capable of increasing the efficiency of a turbine in which it is used.

It has been found, according to the present invention, that it is possible to minimize the hitherto highly precipitous decrease in the efficiency of an expansion turbine with decreasing fluid throughput when this turbine is provided with a nozzle ring having an annular (e.g. circular) array of nozzles; this array has at least two sectors whose nozzles have characteristically different pressure drops and are operable with different throughputs per unit of circumferential extent. Thus the invention includes a method of operating an expansion turbine having at least one expansion chamber provided with such an annular array of nozzles served by the source of variable fluid throughput, the method comprising passing the fluid through substantially all of the nozzles at an elevated throughput of the range, and reducing the flow of the fluid through that sector of the array having the relatively high throughput per unit of circumferential length upon a decrease of the throughput supplied to the turbine stage. The latter step is effected by terminating the flow of fluid through at least some of the nozzles of this sector. The nozzle ring of the present invention thus has a plurality of (i.e. at least two) sectors, each of which is provided with respective nozzles of substantially identical and characteristic pressure drop, the sector having the high throughput per unit circumference length being substantially smaller in axial extent than the other sector.

It has been found that this arrangement is capable of minimizing the effect upon operating efficiency of decreased throughput, even upon relatively large fluctuations in the supply of fluid medium to the turbine. In general the regulation of the throughput, according to the present invention, consists in the blocking or unblocking of certain of the nozzles of that section having the elevated throughput per unit of circumference. Moreover, the selective blocking and unblocking of the nozzles of the high-throughput sector of the nozzle ring minimizes the ventilation losses because, according to this invention, the circumferential extent of the high-throughput section is a minor fraction of the total array of nozzles and, even when all of the nozzles of the high-throughput section are cut off, a limited ventilation loss is experienced.

According to a more specific feature of the present invention, the fixedly positioned nozzles are defined by generally tangentially oriented blades whose included angle with respective tangents of an imaginary circle of the innermost edges of the blades determines the pressure drop across each nozzle and the throughput per unit of circumferential extent. It may be observed, in addition, that this arrangement also ensures that ventilation losses will be held down because any increases of the throughput above the normal operating level are concentrated at the high-throughput sector of small circumferential extent.

According to still another feature of the present invention an expansion turbine has such a nozzle ring co-operating with a plurality of ducts for supplying the pressure medium to the high-throughput and low-throughput sectors, respectively; the duct means communicating with the high-throughput sector includes a plurality of selectively blockable passages, each communicating with a predetermined number of nozzles of the high-throughput sector for blocking and unblocking these respective nozzle groups. Advantageously, the nozzle ring of the present invention may be employed at maximum throughput with a relatively small-diameter rotor at elevated rotational speeds so that rotor-friction and blade-clearance losses are held down. It is thus possible to accomplish, in accordance with the present invention, a relatively efficient operation of an expansion turbine with simple and inexpensive construction and little propensity toward failure even at gas-rectification (liquefaction) temperatures, Turbines of this type are then particularly suitable for gas-separation installation.

Still another specific feature of the present invention resides in the subdivision of the nozzle ring in such manner that the high-throughput sector has a throughput per unit circumferential extent approximately twice that of the throughput per unit circumferential extent of the low-throughput per unit circumferential extent being determined by the included angle of the respective nozzle blades. Thus, the present invention provides through the blade angles throughout the array range between substantially 12° and 30° and the blade angles in the high-throughput and the low-throughput sections are approximately 27° and 15°, respectively. Within each of the sectors, however, the blades should have the same angle while, in the transiton zones between the sectors, the blade or blades can be provided with intermediate angles to afford a continuous transition. Moreover, the low-throughput sector can occupy approximately 70% of the circumference of the array while the high-throughput sector extends over 30% thereof in accordance with a more specific feature of this invention.

According to another feature of this invention, the blades defining the nozzles of the ring are of unequal radial height to afford a greater throughput control in the sense that the blades having the greater height or "altitude" are characterized by a larger throughput per unit of circumferential extent. It appears that, in systems wherein the blades are of uniform radial height, the throughput per unit of circumferential extent is only limited adjustable by modifying the blade angle, and I have found that a significant increase in the throughput can be gained when those blades having relatively large included angles also extend radially beyond the blades of low-throughput into the passages supplying fluid to the nozzles. Thus, the blades of the second or high-throughput sector will generally have a higher altitude than those of the first or low-throughput sector.

The above and other objects, features and advantages of the present invention will become more readily apparent from the following description and specific examples, reference being made to the accompanying drawing in which, FIG. 1 shows somewhat diagrammatically an expansion turbine embodying the present invention;

Figure 1:
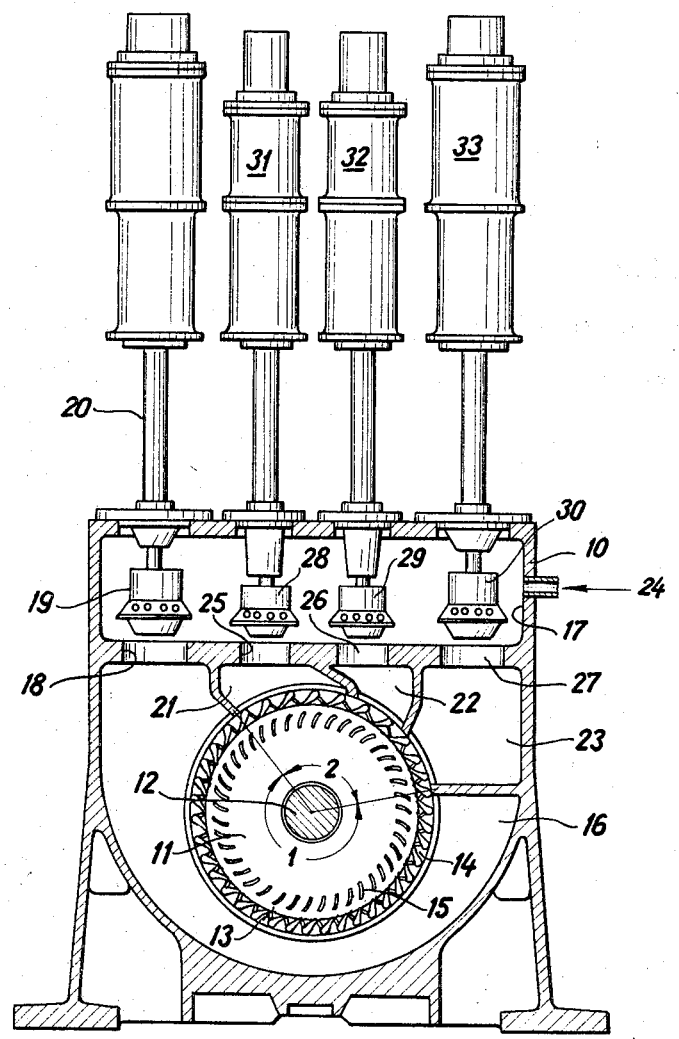

An expansion turbine, according to the present invention, generally comprises a housing 10 in which a rotor 11 is carried by a shaft 12 which can be coupled with any desirable load (e.g. an electric generator or the like). The turbine of FIG. 1 is shown to be a single-chamber or single-stage type in which the expanding fluid is brought to the back pressure of the expansion chamber 13 in a single pass across the rotor, the effluent fluid being discharged in a conventional manner. The nozzle ring 14 (best seen in FIGS. 2 and 3) surrounds the rotor 11 whose blades 15 are convex for interception of the fluid jets of the nozzles 3, 5 defined by the blades 4, 6 of the nozzle ring. As will be described in greater detail herein below, the nozzle ring 14 is subdivided into a low-throughput sector 1 extending over the major part of the circumference and the high-throughput sector 2 occupying only a minor fraction of the array. The low-throughput sector 1 of the nozzle ring 14 communicates with a duct 16 to which fluid is supplied from a manifold chamber 17 in the housing 10 via a valve whose seat 18 cooperates with a valve body 19 controlled by a spindle 20. Similarly, the high-throughput sector 2 of the nozzle array is supplied by fluid through a duct means consisting of, for example, three passages 21, 22 and 23, each subtending several of the nozzles of the second sector for selectively feeding fluid to the nozzles thereof. The passages 21, 22 and 23 are supplied with fluid from the manifold chamber 17 which, in turn, is fed by a source of fluid (represented at 24), via valve seats 25, 26 and 27, respectively cooperating with valve bodies 28, 29 and 30. The latter are provided with spindles 31, 32 and 33, respectively, for individual control of the groups of nozzles of the second sector.

Figure 2:
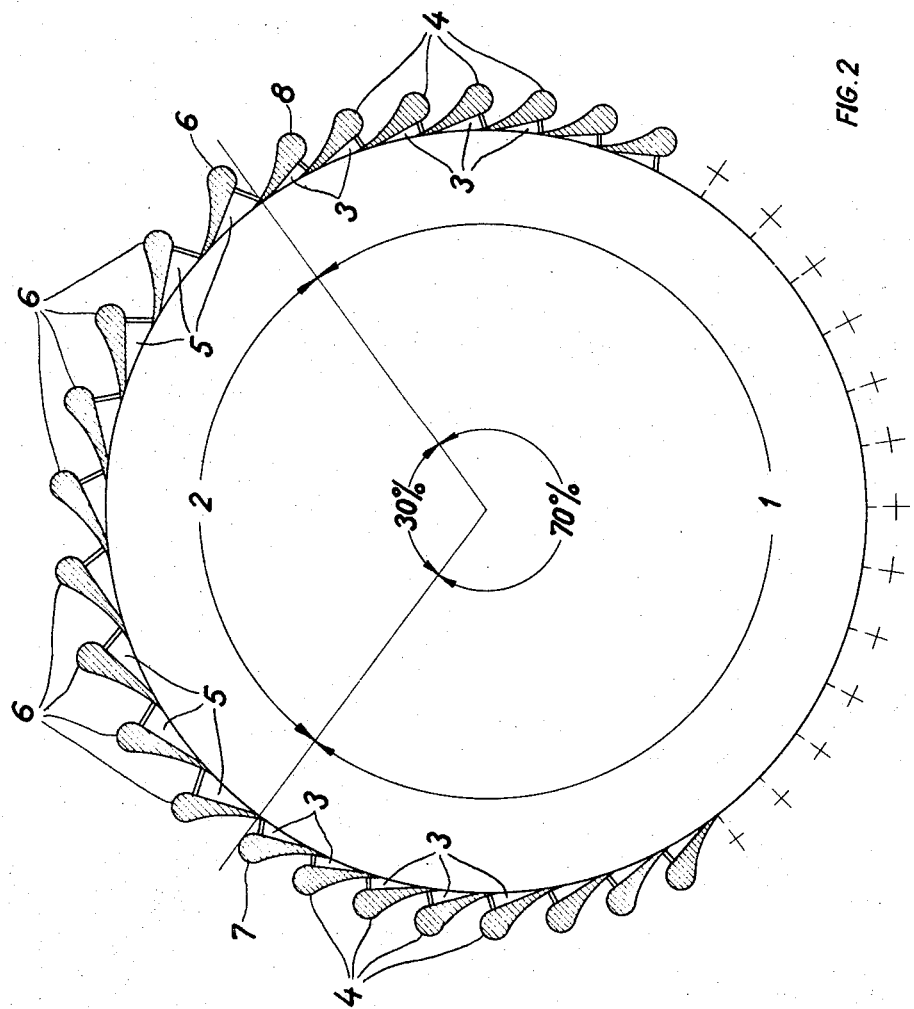
FIG. 2 is an enlarged diagrammatic view of the nozzle ring.
Figure 3:
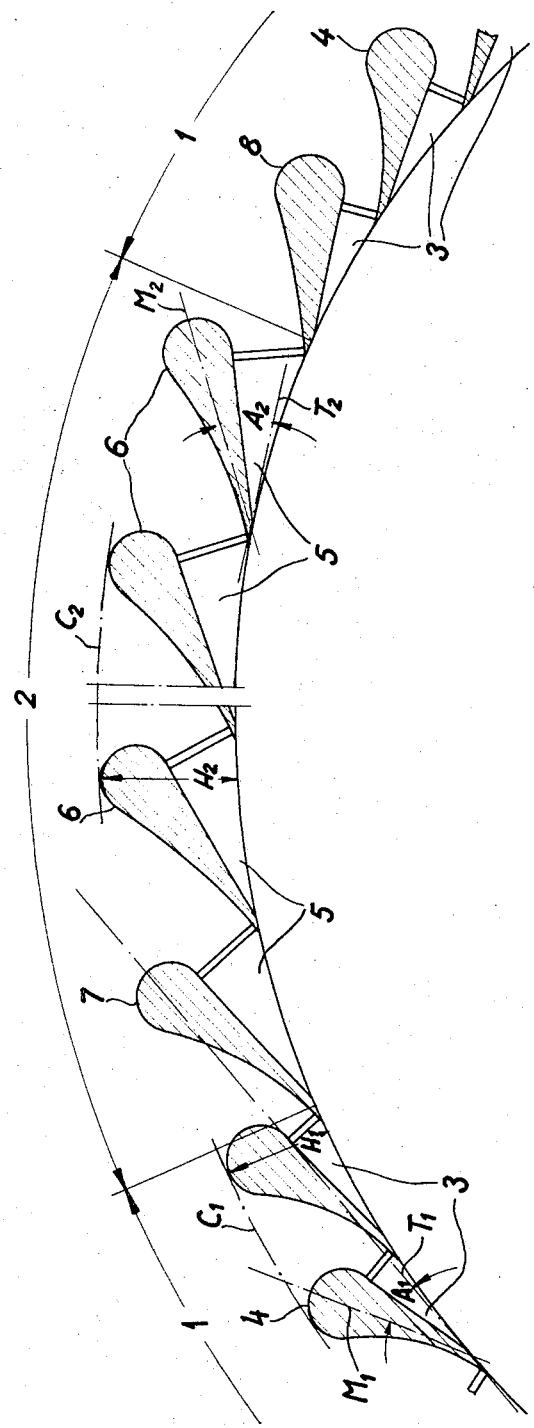
FIG. 3 is a detailed view of the transition zones of the ring illustrated in FIG. 2.

Referring now to FIGS. 2 and 3, wherein the nozzle ring is shown in greater detail, it will be apparent that the high-throughput sector 2 occupies about 30% of the total circumference and angular extent of the array of nozzles while the low-throughput sector 1 occupies approximately 70% of the circumference. The latter sector, in the nozzle ring illustrated, comprises twenty-eight nozzles 3 whose blades 4 include equal angles of 15° with their respective tangents whereas the nine nozzles 5 of the second sector 2 have blades 6 including an angle of 27° with their tangents. More specifically, from FIG. 3 it can be seen that each of the blades 4 of the low-throughput sector 1 have median planes $M_1$ which include angles $A_1$ with the respective tangential planes $T_1$ of substantially 15°, the planes $T_1$ being tangent to the circle or cylinder C of the inner edges of the blades 4, 6. The blades themselves can be generally of a de Laval section, i.e., convergent in the direction of their inner edges from a teardrop-shaped rear portion with a half angle at the inner edge of less than about 3°; this half angle is defined between the boundary surfaces of the blades and the aforementioned median plane. Similarly, the blades 6 of the high-throughput sector have median planes $M_2$ whose angles with their tangential planes $T_2$ are designated as $A_2$ and are about 27°, the half angles being of the same order of magnitude discussed above.

It will also be noted that the altitude (i.e., radial height) of the blades differs from one sector to the other. Thus, the height $H_1$ of the blades 4 is less than the height $H_2$ of the blades 6. $H_1$ and $H_2$, respectively, constitute the differences between the radii of the circles $C_1$ and $C_2$ defining the outer edges of the blades and the radius of the inner circle C.

Between the high- and low-throughput sectors 1 and 2, I provide transition blades 7 and 8 whose included angles and heights are intermediate the limiting angles $A_1$ and $A_2$ and heights $H_1$, $H_2$.

The operation of the system has been generally described above although the following examples of different operational modes will demonstrate how the invention is carried out in practice.

*Example I*

The expansion turbine is operated with maximum throughput as its normal mode. In this case the valves 19, 28, 29 and 30 are all opened and fluid is supplied to all the nozzles of the ring 14. Upon a reduction in throughput, a corresponding number of the nozzles 5 are blocked or taken out of service by selective closure of one or more of the valves 28, 29 and 30 (in the order indicated). When high-throughput sector 2 occupies about 30% of the circumferential array and has a throughput substantially twice that of the low-throughput sector 1, only half of the arc of the ring need be blocked upon a reduction in throughput by comparison with the arc through which flow must be terminated when all of the nozzles have the same throughput. The ventilation losses are substantially diminished.

*Example II*

When the turbine is operated in its normal mode with the lowest throughput of its range, all or most of the valves 28, 29 and 30 are closed and only valve 19 must be open. When the throughput changes, i.e., the supply of fluid increases, the valves 28, 29 and 30 are open in succession in accordance with the throughput increase. Because of the higher throughput per unit of circumference of the nozzle groups successively supplied with fluid under these conditions and because of the large angle of these nozzle blades 6, the net component of the jet velocity in the radial direction is significantly increased and, with a relatively small increase in the arc through which fluid is supplied, a considerable increase in turbine efficiency is gained.

*Example III*

When the turbine is operated with an intermediate throughput as its normal mode, valves 19 and 28 are open and valves 29 and 30 are closed. With increasing fluid availability, valves 29 and 30 can be opened in succession while a decrease in availability of fluid can be compensated for by closing valve 28. The effects of these adjustments on the efficiency of the turbine have been described above.

It will be understood that the principles discussed above are equally applicable to single stage radial turbines with centripetal rotors, multiple-state turbines, radial turbines with centrifugal rotors and axial turbines. These modifications and others in the spirit of the invention which will become apparent to those skilled in the art are, of course, included within the scope of the appended claims.

I claim:

1. An expansion turbine, comprising a housing forming at least one expansion chamber; at least one nozzle ring in said chamber forming an annular array of nozzles for directing respective jets of a fluid medium into said chamber, said ring having a multiplicity of nozzle-forming blades circumferentially spaced around a circle and having inner edges lying therealong, said blades defining between them said nozzles, said nozzles having different fluid throughputs per unit of circumferential extent of said array; a plurality of duct means communicating with said nozzles for supplying a fluid medium to said nozzles; means associated with some of said duct means for selectively blocking and unblocking selected nozzles; and a rotor in said housing having a multiplicity of rotor blades exposed to said jets in said chamber for displacement of said rotor.

2. A turbine as defined in claim 1 wherein said array has a first sector of relatively low throughput per unit of circumferential extent and constituting a major fraction of said array, and a second sector of relatively high throughput per unit of circumferential extent constituting the remainder of said array, the nozzles of each of said sectors being dimensioned so as to have substantially identical pressure drops thereacross.

3. A turbine as defined in claim 2 wherein said nozzles are constituted by circumferentially spaced blades having inner edges lying generally along a common circle, said blades including respective angles with corresponding tangents to said circle at the respective edges, said angle of the blades of each sector being substantially equal, said angles ranging between substantially 12° and 30°.

4. A turbine as defined in claim 1 wherein said array includes at least two nozzle-forming blades intermediate said sectors and including with respective tangents to said circles at the respective inner edges of said nozzle-forming blades, angles intermediate the angles of the blades of said first and second sectors.

5. A turbine as defined in claim 3 wherein said angle of the blades of said second sector is substantially 27°.

6. A nozzle ring for an expansion turbine comprising an annular array of fixedly positioned nozzles, said array having a first sector of relatively low throughput per unit of circumferential extent and constituting a major fraction of said array, and a second sector of relatively high throughput per unit of circumferential extent constituting the remainder of said array, the nozzles of each of said sectors being dimensioned so as to have substantially identical pressure drops thereacross, said blades being so positioned and arranged that the throughput per unit circumferential extent of said second sector is substantially twice that of said first sector.

7. A nozzle ring as defined in claim 6 wherein said first sector extends over substantially 70% of the circumference of said array and said second sector extends over substantially 30% of the circumference of said array.

8. A nozzle ring as defined in claim 6 wherein said angles range between substantially 12° and 30°.

9. A nozzle ring as defined in claim 6 wherein the blades of said sectors have unequal radial heights with respect to said circle.

10. A nozzle ring as defined in claim 9 wherein the blades of said second sector have greater radial height than the blades of said first sector.

11. An expansion turbine comprising a housing forming at least one expansion chamber; at least one nozzle ring in said chamber forming an annular array of nozzles for directing respective jets of a fluid medium into said chamber, said ring having a multiplicity of nozzle-forming blades circumferentially spaced around a circle and having inner edges lying therealong, said blades defining between them said nozzles; said array having a first sector of relatively low fluid throughput per unit of circumferential extent lying along a major part of the circumference of said circle and a second sector extending over a limited arc of said circle of relatively high fluid throughput per unit of circumferential extent of said array; first duct means communicating with the nozzles of said first sector and second duct means communicating with the nozzles of said second sector for supplying a fluid medium to said nozzles, said second duct means including means for selectively blocking and unblocking selected nozzles of said second sector; and a rotor in said housing having a multiplicity of rotor blades exposed to said jets in said chamber for displacement of said rotor.

12. A turbine as defined in claim 11 wherein the blades of said first sector include relatively small angles with respective tangential planes of said circle at the respective inner edge of each blade of said first sector and said blades of said second sector include relatively large angles with the respective axial plane of said circle through the inner edge of each blade of said second sector, said blades converging in the direction of their respective inner edges, the blades of said second sector having portions remote from their respective inner edges at a greater distance from said circle than the corresponding distance of corresponding portions of said blades of said first sector.

13. A turbine as defined in claim 12 wherein said first sector extends over substantially 70% of the circumference of said circle and said second sector extends over substantially 30% thereof, said second duct means including a plurality of passages formed in said housing and communicating respectively with groups of nozzles of said second sector, each of said channels provided with a respective valve operable independently of the valves of the other passages.

14. A turbine as defined in claim 13 wherein said housing is formed with a manifold for supplying fluid medium to both of said first and second duct means, said blades of said first sector including with the respective tangential planes angles of substantially 15° and said blades of said second sector including with their respective tangential planes angles of substantially 27°.

15. In a method of operating an expansion turbine having at least one expansion chamber provided with an annular array of nozzles for discharging respective jets of a pressure fluid into said chamber and having a variable fluid throughput within an operational range, the improvement which comprises the steps of:
  (a) passing said fluid through substantially all of said nozzles at an elevated throughput of said range, while subdividing said array into a relatively small sector and a relatively high sector respectively having relatively high and relatively low throughputs per unit of circumferential extent, the nozzles of each of said sectors having substantially identical pressure drops thereacross, the pressure drop of the nozzles of one sector differing from that of the other sector;
  (b) controlling the flow through said sectors to supply substantially 40 to 60% of the throughput of said chamber to said nozzles of said sector having relatively low throughput per unit of circumferential extent and to supply the remainder of the throughput of said chamber to said nozzles of said sector having relatively high throughput per unit of circumferential extent; and
  (c) terminating flow of said fluid through at least some of the nozzles of the sector having said relatively high throughput per unit of circumferential extent upon a decrease in said throughput within said range.

References Cited

UNITED STATES PATENTS

| | | | |
|---|---|---|---|
| 1,534,721 | 4/1925 | Lasche | 253—39 |
| 2,854,211 | 9/1958 | Bendersky | 253—78 |
| 3,006,603 | 10/1961 | Caruso et al. | 253—39 |

FOREIGN PATENTS

| | | |
|---|---|---|
| 300,002 | 11/1928 | Great Britain. |
| 705,150 | 3/1954 | Great Britain. |
| 825,547 | 12/1959 | Great Britain. |

MARTIN P. SCHWADRON, *Primary Examiner.*

EVERETTE A. POWELL, JR., *Examiner.*